United States Patent [19]

Cramb et al.

[11] Patent Number: 4,624,707

[45] Date of Patent: Nov. 25, 1986

[54] CONTINUOUS CASTING SLAG

[75] Inventors: Alan W. Cramb, New Hope; Michael Byrne, Warminster, both of Pa.

[73] Assignee: Bethlehem Steel Corporation, Bethlehem, Pa.

[21] Appl. No.: 786,675

[22] Filed: Oct. 11, 1985

[51] Int. Cl.[4] ............................ C21B 5/04; C21C 7/02
[52] U.S. Cl. .................................. 75/257; 75/53; 75/58
[58] Field of Search ................ 75/53, 58, 257; 148/26

[56] References Cited

U.S. PATENT DOCUMENTS

| | | |
|---|---|---|
| 3,704,744 | 12/1972 | Halley ........................... 148/26 |
| 3,959,031 | 5/1976 | More ............................. 75/257 |
| 4,066,478 | 1/1978 | DeHaeck ....................... 148/26 |
| 4,204,864 | 5/1980 | Loane ............................ 75/257 |
| 4,248,631 | 2/1981 | More ............................. 75/257 |
| 4,290,809 | 9/1981 | Loane ............................ 75/257 |
| 4,534,791 | 8/1985 | More ............................. 75/257 |

*Primary Examiner*—Peter D. Rosenberg
*Attorney, Agent, or Firm*—John I. Iverson

[57] ABSTRACT

A synthetic slag composition for the continuous casting of steel. The slag composition is used in the tundish to condition and remove sulfur from the molten steel prior to the steel being introduced into the continuous casting mold.

3 Claims, No Drawings

CONTINUOUS CASTING SLAG

BACKGROUND OF THE INVENTION

This invention relates to the continuous casting of steel. It relates particularly to a synthetic slag composition used in the continuous casting of steels.

In the continuous casting of steel, it is well known that improved casting results by covering the surface of the molten steel with a protective layer of synthetic slag in the casting mold. This practice and the slags used have been described in U.S. Pat. Nos. 2,825,947, 3,315,323, 3,642,052, 3,888,294, 3,891,023, 3,926,246 and 4,102,690. The synthetic slags described in these patents are designed to (1) act as an insulating layer to prevent the molten steel for losing heat, (2) protect the molten steel from air oxidation, (3) provide lubrication and better heat transfer between the steel casting and the mold, and (4) to absorb undesirable impurities, such as aluminum oxide from the molten steel.

While there has been considerable development of synthetic slags used as described above in the open-ended continuous casting mold, there has been very little development of synthetic slags for use in the tundish in order to condition the molten steel prior to its introduction into the continuous casting mold.

SUMMARY OF THE INVENTION

It is an object of this invention to provide an improved synthetic slag composition which is especially useful for placing on the surface of molten steel in the tundish prior to continuous casting.

It is a further object of this invention to provide an improved synthetic slag composition which has the ability to desulfurize the steel to very low sulfur levels prior to its being continuously cast.

It is a still further object of this invention to provide an improved synthetic slag composition which quickly melts to a liquid when applied and remains highly fluid even after it has absorbed considerable amounts of aluminum oxide from the molten steel.

It is another object of this invention to provide a synthetic slag composition that will provide a means of tracing tundish slag inclusions that might occur in the continuously cast steel product.

A further object of this invention is to provide a synthetic slag composition which is substantially chemically and thermally stable when contained in the tundish over extended periods of time.

It has been discovered that the foregoing object of this invention can be obtained by a synthetic slag composition falling substantially within the following ranges:

CaO: 30–80% by weight
$CaF_2$: 20–40% by weight
$Al_2O_3$: 0–10% by weight
$SiO_2$: <5% by weight
MgO: 5–20% by weight
FeO+MnO: <1% by weight
$K_2O+Na_2O$: 0–10% by weight
$BaO+CeO_2$ (either or both): 10–60% by weight
Metalloids (Al,Ca,Mg): 0–5% by weight.

DESCRIPTION OF THE PREFERRED EMBODIMENT

The synthetic slag composition of the present invention has been developed to provide a multipurpose liquid slag cover for the molten steel when it is contained in the tundish prior to its introduction into the continuous casting mold. Other synthetic slag compositions of the types described in the prior patents listed above are more suitable for use in the open-ended continuous casting mold itself.

The synthetic slag composition of this invention can be prepared from a wide variety of raw materials which either contains or, when heated, produces the desired oxides and flourides used in my invention. However, when selecting materials other than pure oxides and fluorides for preparing the slag composition of this invention care should be used to keep impurities to a minimum. However, up to about 5% by weight of metalloids (Al, Ca, Mg) are desirable to combine with any oxides which readily react with a killed steel that may be present in the slag.

The slag composition of the present invention melts to a liquid very quickly when applied to the surface of the molten steel as a solid powder. It could, however, be premelted before application, if desired. The amounts of $CaF_2$ were selected to insure that the slag would remain highly fluid and liquid even after considerable periods of time and even after absorbing considerable amounts of $Al_2O_3$ for the steel in the tundish.

It is important that for the slag composition of this invention to be most effective, good tundish practices should be used. Sufficient slag should be added to always keep a layer of liquid slag on the surface of the steel throughout the tundish. The tundish design and the manner in which the molten steel is added to and discharged from the tundish should be arranged to reduce turbulence to a minimum. Preferably the tundish should be covered and a nonoxidizing atmosphere maintained in the tundish above the liquid slag floating on the steel.

The slag composition of this invention permits us to desulfurize the molten steel by up to 50% to sulfur levels as low as 0.005%. The desulfurization characteristics of this slag are as a result of the CaO plus BaO or $CaO_2$ additives to the slag. The BaO or $CeO_2$ additives have the added feature of identifying tundish slag inclusions in the continuously cast product. The presence of BaO or $CeO_2$ in the inclusion can be determined by a standard electron probe microanalysis and if detected as a tundish slag inclusion the operation can be modified to prevent the entrainment of the tundish slag in the continuously cast product.

In our slag, we have added up to 20% MgO to reduce the rate of slag erosion of the tundish refractories.

In order to further illustrate our invention, we have provided the following specific example.

A rough mixture of oxides and flourides was prepared in the following proportions.

CaO: 30%
BaO: 35%
$SiO_2$: 5%
MgO: 10%
$Ca F_2$: 20%

The mixture was added to aluminum killed low carbon steel in a MgO lined tundish having a complete slag cover. The slag mixture was added at the rate of 4 pounds (1.81 kilograms) per ton of steel and a liquid layer of the slag about 3" inches (7.62 mm) thick was maintained on the steel during the entire cast.

The sulfur content of the oxide steel in the ladle discharging into the tundish was 0.015% and the sulfur content of the steel leaving the tundish was 0.012%.

We claim:

1. A synthetic slag composition for use in the tundish of a steel continuous casting facility having the ability to reduce the sulfur content in the steel, consisting essentially of
   CaO: 30–80% by weight
   $CaF_2$: 20–40% by weight
   $Al_2O_3$: 0–10% by weight
   $SiO_2$: <5% by weight
   MgO: 5–20% by weight
   FeO+MnO: <1% by weight
   $K_2O+Na_2O$: 0–10% by weight
   BaO, +$CeO_2$ (either or both): 10–70% by weight
   Metalloids (Al, Ca, Mg): 0–5% by weight.

2. In a method of continuously casting steel, the addition of a slag mixture to the surface of the molten steel contained in a tundish, said slag mixture consisting essentially of
   CaO: 30–80% by weight
   $CaF_2$: 20–40% by weight
   $Al_2O_3$: 0–10% by weight
   $SiO_2$: 21 5% by weight
   MgO: 5–20% by weight
   FeO+MnO: <1% by weight
   $K_2O+Na_2O$: 0–10% by weight
   BaO, +$CeO_2$ (either or both): 10–70% by weight
   Metalloids (Al, Ca, Mg): 0–5% by weight.

3. The method of claim 2 in which the slag mixture is added to the tundish at the rate of approximately 4 pounds per ton of steel.

* * * * *